(12) United States Patent
Boinodiris et al.

(10) Patent No.: US 11,238,472 B2
(45) Date of Patent: *Feb. 1, 2022

(54) EVALUATING AND DISPLAYING FEEDBACK FOR AN ITEM DISTRIBUTED TO A GROUP OF USERS AT A COLLABORATIVE EVENT

(71) Applicant: International Business Machines Corporation, Armonk, NY (US)

(72) Inventors: Phaedra Boinodiris, Apex, NC (US); David P. Stowell, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/393,129

(22) Filed: Apr. 24, 2019

(65) Prior Publication Data
US 2019/0251584 A1 Aug. 15, 2019

Related U.S. Application Data

(63) Continuation of application No. 14/592,291, filed on Jan. 8, 2015, now Pat. No. 10,373,181.

(51) Int. Cl.
*G06Q 30/00* (2012.01)
*G06Q 30/02* (2012.01)

(52) U.S. Cl.
CPC .............................. *G06Q 30/0205* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 7,536,315 | B2 * | 5/2009 | Tsyganskiy | G06Q 10/10 |
| | | | | 705/7.32 |
| 8,121,886 | B2 * | 2/2012 | Azar | G06Q 30/0282 |
| | | | | 705/7.32 |
| 8,548,996 | B2 * | 10/2013 | Tareen | G06F 16/24578 |
| | | | | 707/732 |
| 8,943,044 | B1 | 1/2015 | Saylor et al. | |

(Continued)

OTHER PUBLICATIONS

Appendix P, "List of IBM Patents or Patent Applications Treated as Related", Mar. 13, 2020, 2 pages.
IBM, "Approach and System to Enable Large Scale Social Analysis", Publication Date Jul. 7, 2009, IP.com No. IPCOM000184998D, 3 pages.

(Continued)

*Primary Examiner* — Alan S Miller
*Assistant Examiner* — Mustafa Iqbal
(74) *Attorney, Agent, or Firm* — Maeve M. Carpenter; Madeline F. Schiesser; Keohane & D'Alessandro, PLLC (57) ABSTRACT

Approaches presented herein enable evaluating and displaying feedback for an item distributed to a group of users, e.g., at a collaborative event. Specifically, at least one approach includes receiving the item (e.g., a topic, idea, product) from a first user, and distributing the item to the group of users, wherein the group of users is located within an identified geographic proximity to the first user. An assigned value (e.g., demand quantified though buy/sell data) is then received for the item from one or more users of the group of users, and displayed to the first user via a mobile device, along with a real-time location of each user of the group of users. In one approach, each user's mobile device displays a geographic distance from other users at the collaborative event.

20 Claims, 6 Drawing Sheets

(56) References Cited

U.S. PATENT DOCUMENTS

| | | | |
|---|---|---|---|
| 2004/0162751 A1 | 8/2004 | Tsyganskiy et al. | |
| 2005/0033615 A1 | 2/2005 | Nguyen et al. | |
| 2008/0312946 A1* | 12/2008 | Valentine | G06Q 30/02 705/64 |
| 2009/0063252 A1* | 3/2009 | Abhyanker | G06Q 30/02 705/7.32 |
| 2011/0054976 A1* | 3/2011 | Adler | G06Q 10/109 705/7.18 |
| 2011/0252338 A1 | 10/2011 | Asher et al. | |
| 2013/0132284 A1 | 5/2013 | Convertino et al. | |
| 2013/0215116 A1* | 8/2013 | Siddique | G06Q 20/204 345/420 |
| 2014/0214489 A1* | 7/2014 | Bedi | G06Q 30/0203 705/7.32 |
| 2014/0358632 A1* | 12/2014 | Graff | G06Q 30/0224 705/7.29 |
| 2015/0220948 A1* | 8/2015 | Cooper | H04M 3/4878 705/7.32 |
| 2015/0370456 A1 | 12/2015 | Kobayashi et al. | |
| 2016/0203502 A1 | 7/2016 | Boinodiris et al. | |

OTHER PUBLICATIONS

IBM, "Using IBM Social Business to Take Your Business Relationships to the Next Level: A Game Changer for Small, Medium, and Large Businesses", Copyright IBM Corp. 2011, 18 pages.

Wei-Feng Tung, "Analytical Trackback Interconnections for SNS-Based Blog Services", AN-11501950, 2010, pp. 615-620.

Mustafa Iqbal, USPTO Office Action, U.S. Appl. No. 14/592,291, Notification Date Mar. 30, 2017, 38 pages.

Mustafa Iqbal, USPTO Final Office Action, U.S. Appl. No. 14/592,291, Notification Date Aug. 24, 2017, 47 pages.

Mustafa Iqbal, USPTO Office Action, U.S. Appl. No. 14/592,291, Notification Date Dec. 13, 2017, 13 pages.

Mustafa Iqbal, USPTO Final Office Action, U.S. Appl. No. 14/592,291, Notification Date May 30, 2018, 14 pages.

Mustafa Iqbal, USPTO Office Action, U.S. Appl. No. 14/592,291, Notification Date Dec. 6, 2018, 14 pages.

Mustafa Iqbal, USPTO Notice of Allowance and Fees Due, U.S. Appl. No. 14/592,291, dated Mar. 25, 2019, 9 pages.

Ulf Blanke et al., "Capturing crowd dynamics at large scale events using participatory GPS-localization", 2014 IEEE Ninth International Conference on Intelligent Sensors, Sensor Networks and Information Processing (ISSNIP), 2 pages.

* cited by examiner

EVALUATING AND DISPLAYING FEEDBACK FOR AN ITEM DISTRIBUTED TO A GROUP OF USERS AT A COLLABORATIVE EVENT

RELATED APPLICATION DATA

The present patent document is a continuation of U.S. patent application Ser. No. 14/592,291, filed Jan. 8, 2015, entitled "EVALUATING AND DISPLAYING FEEDBACK FOR AN ITEM DISTRIBUTED TO A GROUP OF USERS AT A COLLABORATIVE EVENT", the disclosure of which is incorporated herein by reference.

BACKGROUND

1. Field of the Invention

This invention relates generally to enhanced event participation and, more specifically, to optimized collaborative event engagement using gamification.

2. Description of the Related Art

Many industries host or sponsor various types of events, including seminars, conferences, trade shows, etc. Similarly, many professional organizations will sponsor and promote conventions. While these various events may be somewhat varied in size, scope, participants, and purpose, there are many common elements. For example, at most of these events, there are speakers, a topic/purpose, exhibits, vendors, etc. A conference space is usually set up in a location at the event venue and the speakers, vendors, and attendees interact through a series of events, meetings, speeches, discussions, etc.

While events are a significant and valuable way for attendees to enhance their professional and social relationships, attendees of these events increasingly want to be entertained. While doing so, they are continuously seeking new levels of engagement that are personal and meaningful. Businesses and organizations across industries from finance to defense are capitalizing on this trend by incorporating differing degrees of aspects of games into their experiences. Games are a natural medium that one thinks of when considering cross-cultural, gender, and age-engaged entertainment. The range of aspects of games can start at the lower end with gamification ramping up to a more explicit serious game. Gamification is in essence a motivation used to drive user behavior. However, current gamified solutions for conferences are typically limited to scavenger hunt style games, which have limited appeal/effectiveness.

SUMMARY

In general, approaches presented herein enable evaluating and displaying feedback for an item distributed to a group of users, e.g., at a collaborative event. Specifically, at least one approach includes receiving the item (e.g., a topic, idea, product) from a first user, and distributing the item to the group of users, wherein the group of users is located within an identified geographic proximity to the first user. An assigned value (e.g., demand quantified though buy/sell data) is then received for the item from one or more users of the group of users, and displayed to the first user via a mobile device, along with a real-time location of each user of the group of users. In one approach, each user's mobile device displays a geographic distance from other users at the collaborative event.

One aspect of the present invention includes a method for evaluating an item distributed to a group of users, the method comprising the computer-implemented steps of: receiving the item from a first user; distributing the item to the group of users, wherein the group of users is located within an identified geographic proximity to the first user; receiving an assigned value for the item from one or more users of the group of users; and displaying, to the first user via a mobile device, a real-time location of each user of the group of users along with the assigned value from the one or more users of the group of users.

Another aspect of the present invention provides a system for evaluating an item distributed to a group of users, comprising: a memory medium comprising program instructions; a bus coupled to the memory medium; and a processor, for executing the program instructions, coupled to an collaboration tool via the bus that when executing the program instructions causes the system to: receive the item from a first user; distribute the item to the group of users, wherein the group of users is located within an identified geographic proximity to the first user; receive an assigned value for the item from one or more users of the group of users; and display, to the first user via a mobile device, a real-time location of each user of the group of users along with the assigned value from the one or more users of the group of users.

Another aspect of the present invention provides a computer program product for evaluating an item distributed to a group of users at a collaborative event, the computer program product comprising a computer readable storage device, and program instructions stored on the computer readable storage device, to: receive the item from a first user; distribute the item to the group of users, wherein the group of users is located within an identified geographic proximity to the first user, and wherein the first user and the group of users are attendees of a same interactive event; receive an assigned value for the item from one or more users of the group of users; and display, to the first user via a mobile device, a real-time location of each user of the group of users along with the assigned value from the one or more users of the group of users.

Still yet another aspect of the present invention includes a method for evaluating an item distributed to a group of users at a collaborative event, comprising: providing a computer infrastructure operable to: receive the item from a first user; distribute the item to the group of users, wherein the group of users is located within an identified geographic proximity to the first user, and wherein the first user and the group of users are attendees of a same interactive event; receive an assigned value for the item from one or more users of the group of users; and display, to the first user via a mobile device, a real-time location of each user of the group of users along with the assigned value from the one or more users of the group of users.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments will now be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for evaluating and displaying feedback for an item distributed to a group of users, e.g., at a collaborative event. Specifically, at least one approach includes receiving the item (e.g., a topic, idea, product) from a first user, and distributing the item to the group of users, wherein the group of users is located within an identified geographic proximity to the first user. An assigned value (e.g., demand quantified though buy/sell data) is then received for the item from one or more users of the group of users, and displayed to the first user via a mobile device, along with a real-time location of each user of the group of users. In one approach, each user's mobile device displays a geographic distance from other users at the collaborative event.

The approaches described herein contain numerous advantages over present methods by providing a collaborative ideation and networking application whereby conference attendees buy/sell ideas on a mobile app, and a RFID/GPS enabled mobile game tells each attendee within how many feet an idea supporters/resistors is. Each attendee may be tagged with his/her idea and shown geographically using a map function of the application, wherein a click on an attendee allows the application to zoom into and access his/her idea and his/her idea's stock price/voting mechanism.

Figure 1:
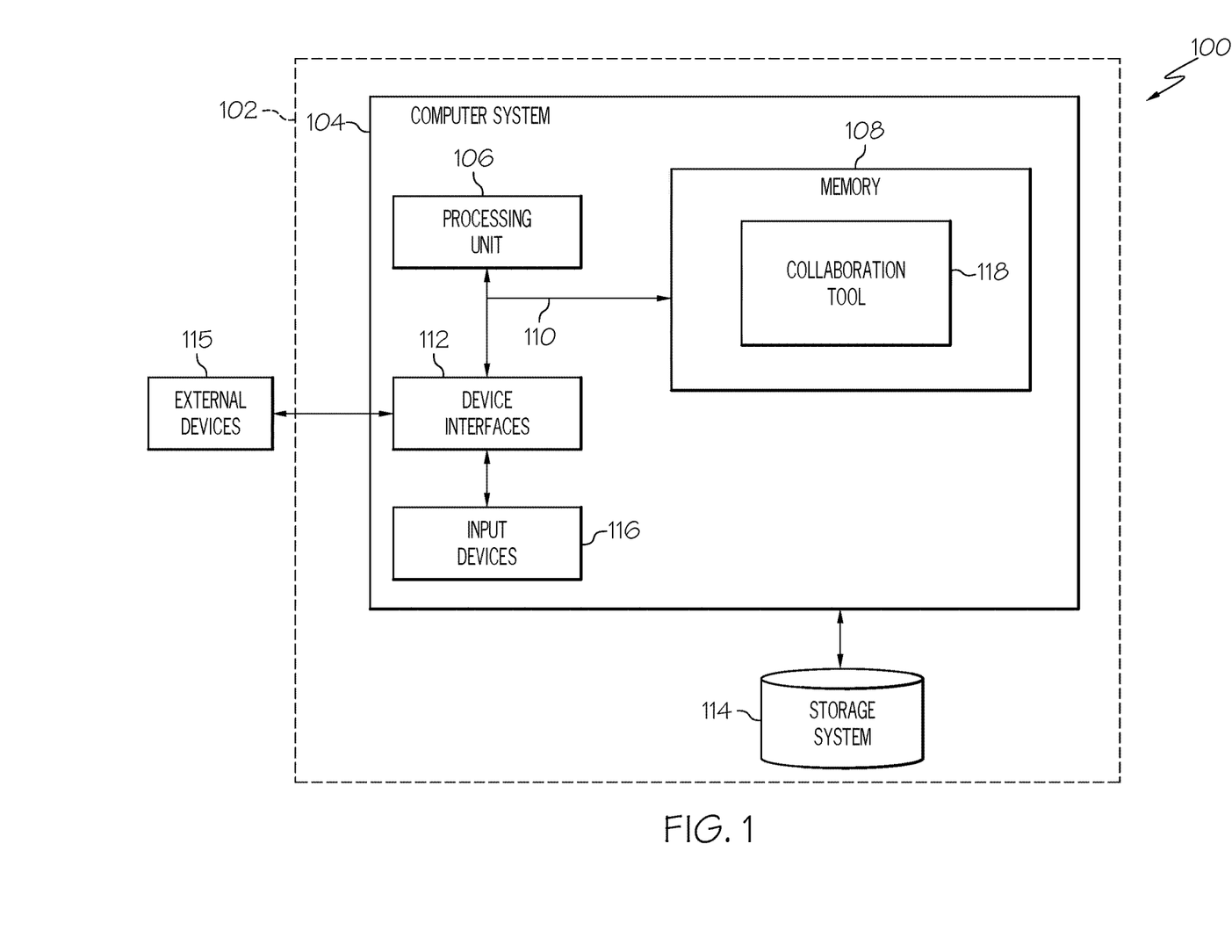
FIG. 1 shows an architecture in which the invention may be implemented according to illustrative embodiments.

Referring now to FIG. 1, a computerized implementation 100 of an exemplary embodiment will be shown and described. As depicted, implementation 100 includes computer system 104 deployed within a computer infrastructure, such as a mobile device 102. This is intended to demonstrate, among other things, that the present invention could be implemented within a network environment (e.g., the Internet, a wide area network (WAN), a local area network (LAN), a virtual private network (VPN), etc.), a cloud-computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, mobile device 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for evaluating and displaying feedback for an item distributed to a group of users, e.g., at a collaborative event. It should be understood that any other computers implemented under the present invention may have different components/software, but will perform similar functions. As shown, computer system 104 includes a processing unit 106 capable of communicating with an collaboration tool 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115, input devices 116, and collaboration tool 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating collaboration tool 118, which is stored in memory 108 and/or storage system 114. While executing computer program code, processing unit 106 can read and/or write data to/from memory 108, storage system 114, and collaboration tool 118. Storage system 114 can include VCRs, DVRs, RAID arrays, USB hard drives, optical disk recorders, flash storage devices, and/or any other data processing and storage elements for storing and/or processing data.

Figure 2:
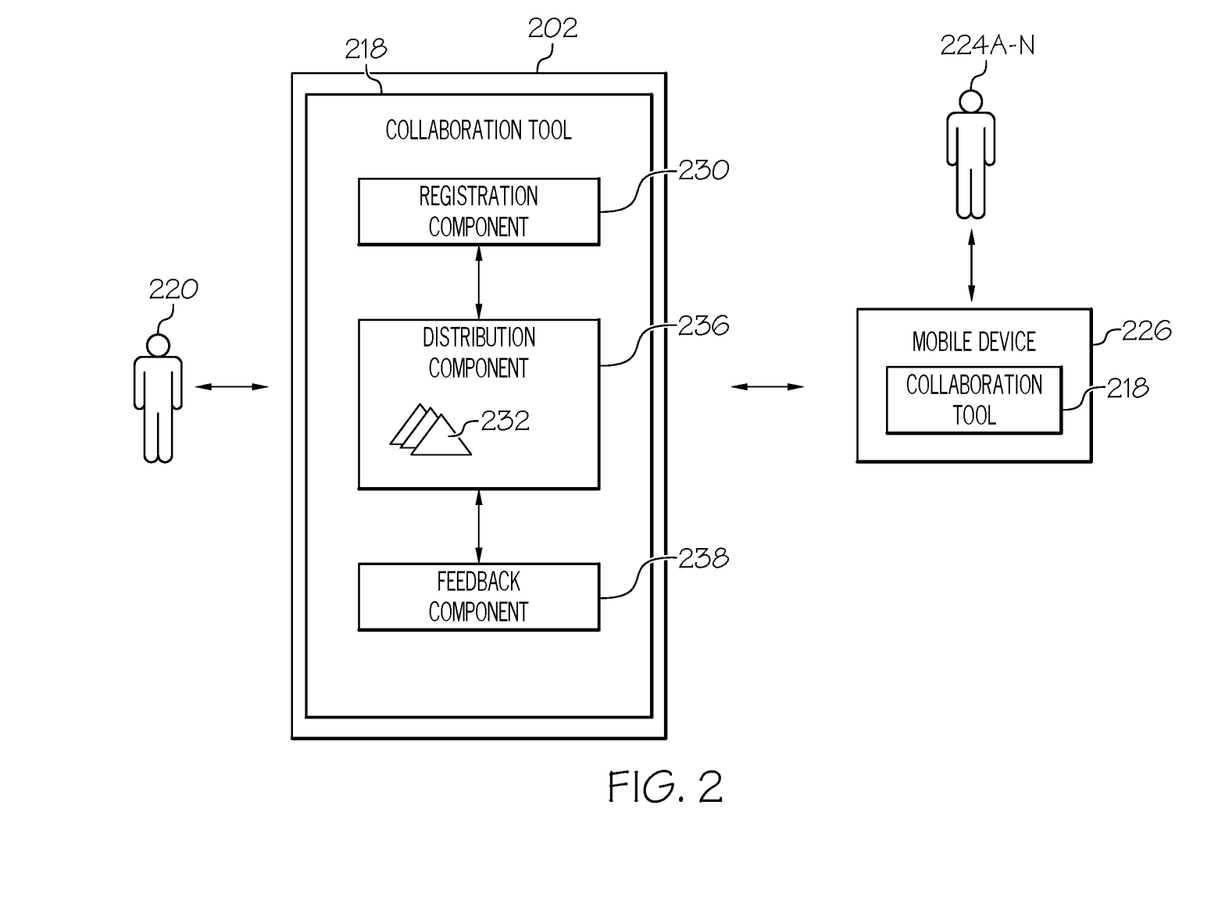
FIG. 2 shows a more detailed view of an collaboration tool for evaluating an item distributed to a group of users at a collaborative event according to illustrative embodiments.

Referring now to FIG. 2, the structure and operation of mobile device 202 and collaboration tool 218, which together are capable of evaluating and displaying feedback for an item distributed to a group of users, will be described in greater detail. In various embodiments, mobile device 202 may include, without limitation, a mobile computing device, a smart phone, a telephone, a digital telephone, a cellular telephone, eBook readers, a personal digital assistant (PDA), a handset, an ultra-mobile device, a messaging device, a computer, a laptop computer, a notebook computer, a netbook computer, a handheld computer, a tablet computer, a mini-computer, a network appliance, a web appliance, consumer electronics, programmable consumer electronics, game devices, or combination thereof. The embodiments are not limited in this context.

As shown, mobile device 202 is associated with and operated by a first user 220, who is an attendee at a collaborate/interactive event, e.g., an industry-specific conference. Collaboration tool 218 includes a registration component 230 for enrolling first user 220 and a group of users 224A-N, each operating his/her own mobile device 226, as attendees of the same conference. As shown, mobile device 226 similarly contains collaboration tool 218, which may be a mobile device application downloaded to each attendees' mobile device, e.g., in advance of the conference or during initial registration. In one embodiment, collaboration tool 218 is downloaded to each mobile device using a QR barcode scanner. Once installed, first user 220 and group of users 224A-N are recognized as attendees of the same conference, and collaborative interaction may commence.

In one embodiment, prior to the event, first user 220 and group of users 224A-N can each provide a user profile that contains varying levels of information. For example, each user can select, store, and maintain multiple user profiles for multiple events. Each user profile can have different settings since each event attendee's goals and objectives for attending each event may be different. Each user can enter relevant employment, demographic, information, etc., for the selected profile. Additionally, the event attendee will have the option of entering authentication credentials for a plurality of social media messaging platforms, by clicking or otherwise selecting an icon. By entering and saving the event attendees authentication credentials, event management or other attendees will be able to use the social media platform APIs to send and receive communications.

Figure 3:
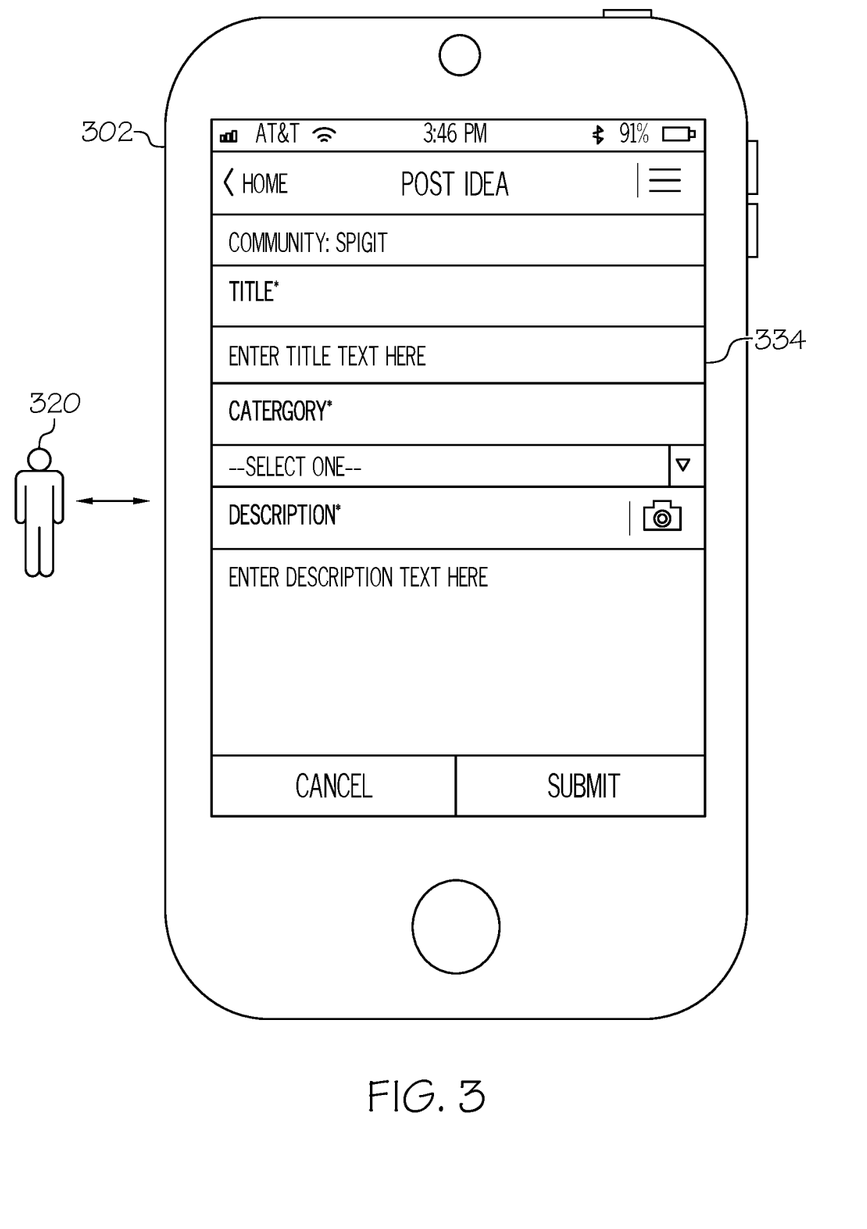
FIG. 3 shows an exemplary mobile device according to illustrative embodiments.

Next, mobile device 202 receives one or more items 232 (e.g., a product, an idea, a discussion topic, a presentation topic, a blog post, a reaction to a presentation topic, or a response to virtually anything else occurring at the conference) from first user 220 at a distribution component 236. In one embodiment, first user 320 posts an idea to an input component of a GUI 334, as shown in FIG. 3. First user 320 can provide a title, category, description, etc., which is then published/distributed to group of users 224A-N (FIG. 2) when the submit button is selected.

Figure 4:
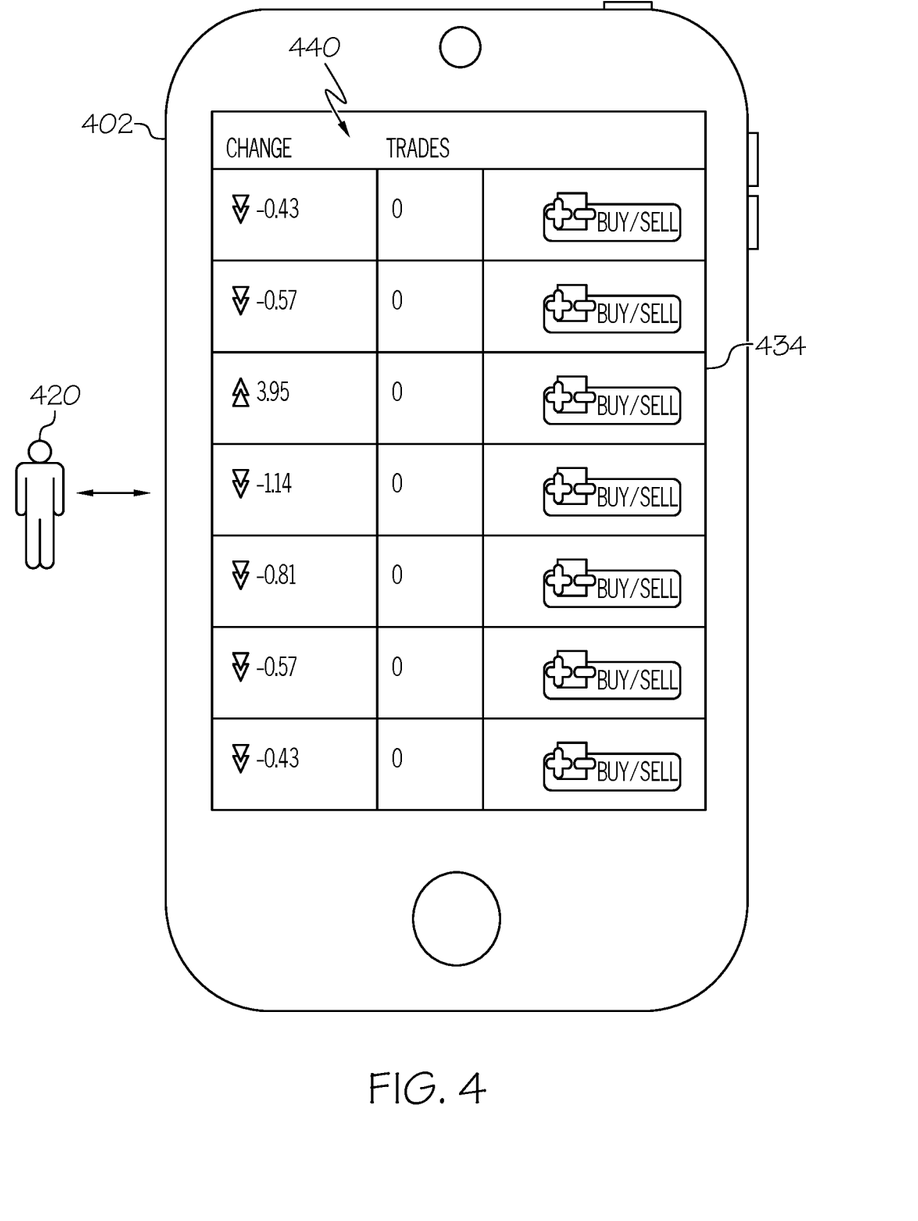
FIG. 4 shows an exemplary mobile device according to illustrative embodiments.

Referring again to FIG. 2, each attendee from group of users 224A-N is then able to view the item(s) 232 published by first user 220, and assign it a value. A feedback component 238 aggregates the assigned values from each of users 224A-N, and displays this information to first user 220. In one embodiment, feedback component 238 determines a set of users from group of users 224A-N that have either: assigned a positive value to item 232, or assigned a negative value to item 232. In another embodiment, as shown in FIG. 4, the assigned value is represented as a prediction market-type stock price/voting mechanism 440, which aggregates the beliefs and opinions of multiple conference attendees to generate and quantify a desire for the published item. This can be displayed to first user 420 via GUI 434. This allows each attendee to receive real-time values associated with each idea, as provided by fellow attendees, including the item having a highest assigned value.

Figure 5:
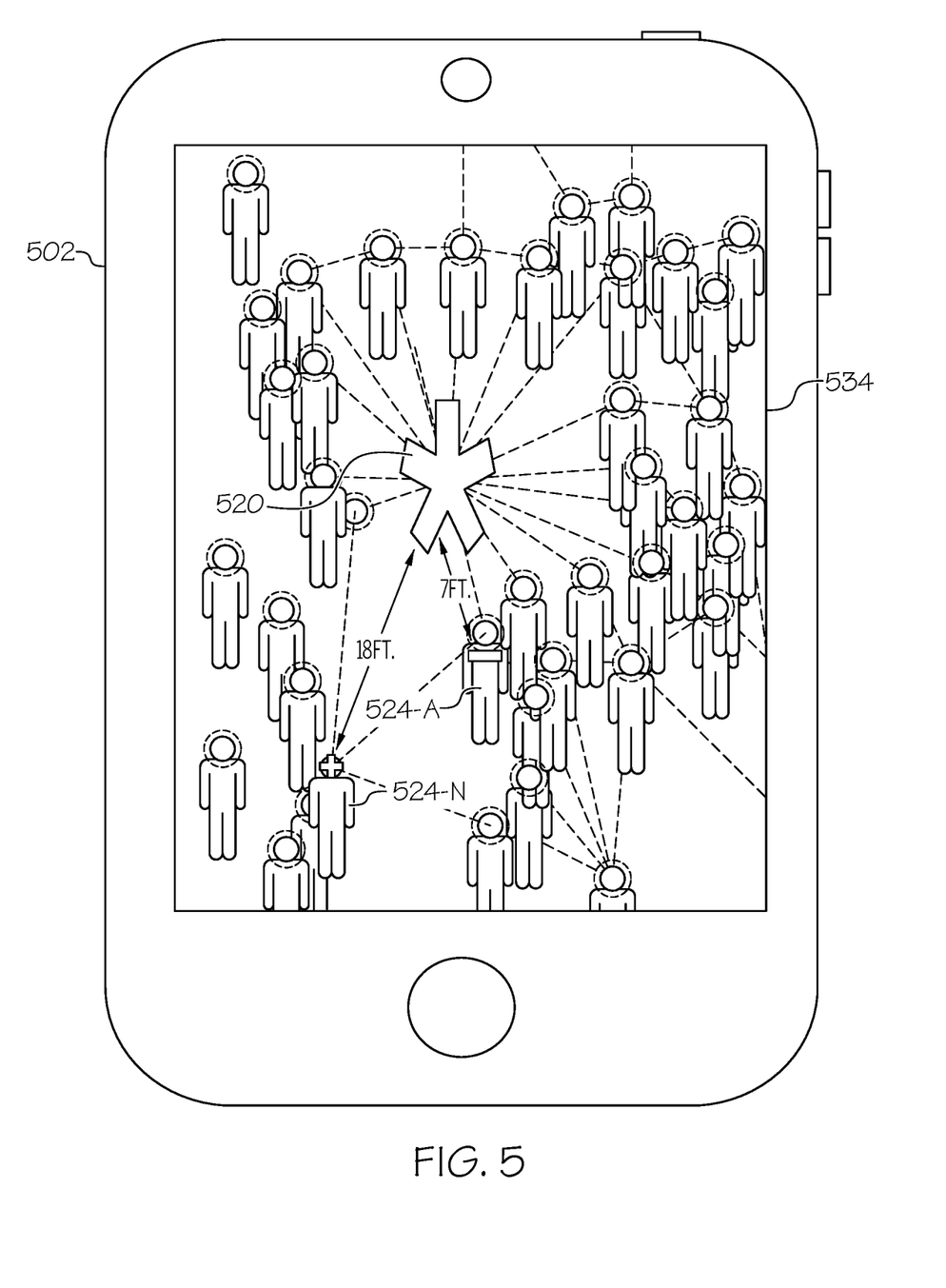
FIG. 5 shows an exemplary mobile device according to illustrative embodiments.

As shown in FIG. 5, first user 520 also has the ability to view his/her current location relative to each user 524A-N, as well as the assigned value from those users who provided a value. In this non-limiting example, display component 242 (FIG. 2) displays, via GUI 534, a quantified geographic distance between first user 520 and each user 524A-N, along with an indication of whether the particular user has a positive opinion (+) or a negative opinion (−) of first user's idea. In other embodiments, instead of using a +/− graphic, alternative graphical elements, including colors, could be used in event activity maps to indicate a level of activity and interest in the idea. For example, by using red, orange and yellow colored graphics to indicate a user with strong interest in the idea, and using blue and green to represent users with weak interest or a negative rating for the idea, a "heat" map could be generated. This provides another visual guide for first user 520.

In one embodiment, first user 520 and users 524A-N grant various levels of permission for tracking and location display (e.g., provide position tracking for event attendee only, provide position tracking for designated friends or colleagues, provide position tracking for all events and locations, etc.). Users may also "check in" at an activity by scanning a QR code or bar code located at an event venue such as a booth when prompted by a "push" notification or other method. Each user may configure his/her mobile device to publish GPS or geocoding information.

In one example, if first user 520 has enabled tracking, when another user 524A-N (e.g., another user who has indicated a negative opinion of an idea) is located within a preconfigured proximity, mobile device 502 will produce a notification (e.g., pop-up alert, e-mail, text message, etc.). Each user will be able to establish the boundaries for tracking information so as to protect privacy at his/her comfort level. In a preferred embodiment, the location and movement tracking functions use aggregated data only and no movement activity for any event attendee is stored except in the user's personal profile. Additionally, a movement database can be created for each of the event attendees based on their movements through the event venue.

First user 520 can leverage this insight in a number of useful ways. First, it allows first user 520 to identify and locate those attendees that have either a negative or positive opinion so that first user 520 can engage in a meaningful discussion to understand the reasons for the opinions. Second, it allows first user 520 to identify attendees to invite to a meeting/workshop or to one or more social media websites associated with first user for further interaction. Based on a discussion or workshop, for example, first user 520 may refine his/her idea, and see the effect immediately by re-publishing the idea and obtaining an updated valuation from the other attendees.

In one embodiment, top idea submitters can be recognized at the conference, either through a public award/prize, a special networking reception with other top idea submitters, or an invite to a locked social media group. However, it'll be appreciated that many possible benefits can be awarded to conference attendees.

Although not explicitly shown, it will be appreciated that embodiments herein include some form of security and/or encryption mechanism for verifying access to the data and information contained in and transmitted to and from each conference attendee. The security mechanism may be incorporated into collaboration tool 118 (FIG. 1). The security mechanism is preferably configured to protect the integrity and security of the information transmitted via a wireless network supporting the collaborative event. In some embodiments, the security mechanism may be contained in or implemented in conjunction with certain hardware components (not shown) such as hardware-based firewalls, switches, dongles, and the like.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 6:
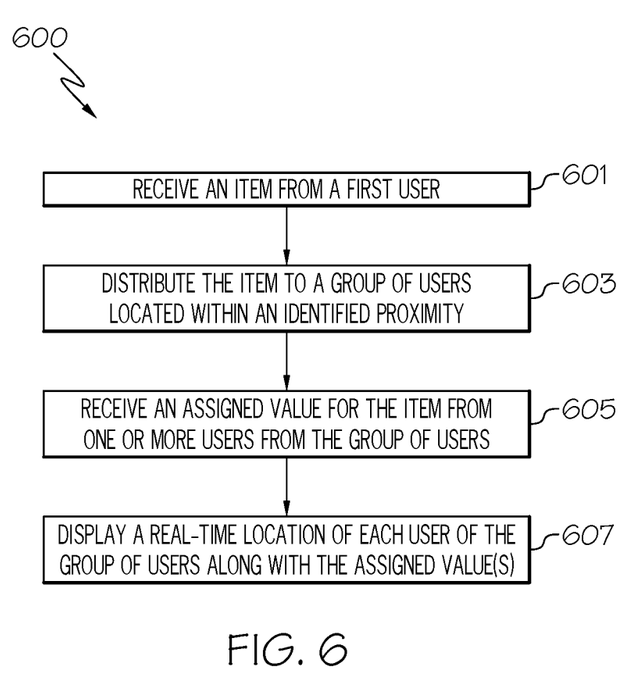
FIG. 6 shows a process flow for displaying and evaluating an item distributed to a group of users at a collaborative event according to illustrative embodiments.

As depicted in FIG. 6, a system (e.g., computer system 104) carries out the methodologies disclosed herein. Shown is a process flow 600 for controlling inadvertent inputs to a mobile device. At 601, an item is received from a first user. At 603, the item is distributed to a group of users, wherein the group of users is located within an identified geographic proximity to the first user. At 605, an assigned value is received for the item from one or more of the group of users. At 607, a real-time location of each user of the group of users is displayed to the first user along with the assigned value from one or more users of the group of users.

Process flow 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

It can be appreciated that the approaches disclosed herein can be used within a computer system to optimize a network and component configuration in a dense server environment. In this case, as shown in FIG. 1, collaboration tool 118 can be provided, and one or more systems for performing the processes described in the invention can be obtained and deployed to computer infrastructure 102. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, collaboration tool 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a network composition and component configuration in a dense server environment. Thus, embodiments herein disclose a process for supporting computer infrastructure, comprising integrating, hosting, maintaining and deploying computer-readable code into a computing system (e.g., computer system 104), wherein the code in combination with the computing system is capable of performing the functions described herein.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for evaluating an item distributed to a group of users. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for evaluating an item distributed to a group of users, the method comprising the computer-implemented steps of:
   creating a plurality of profiles for a first user, each profile of the plurality of profiles comprising a level of information associated with a type of event;
   obtaining from a mobile device of the first user a scanned code associated with an event;
   identifying a profile of the plurality of profiles of the first user associated with a type of the event based on the scanned code associated with the event;
   granting the group of users access to view the identified profile of the first user, wherein each user of the group of users has scanned the code associated with the event;
   receiving, from the identified profile, the item from the first user;
   distributing the item to the group of users;
   receiving an assigned value for the item and real-time user location tracking information from a set of profiles associated with the one or more users of the group of users, the set of profiles based on the code associated with the event scanned by the one or more users of the group of users;
   generating a visual information indicator corresponding to the assigned value and to a profile of the set of profiles associated with the one or more users of the group of users;
   associating the generated visual information indicator with the real-time user location tracking information;
   generating a video display of a physical area of the event;
   displaying, to the first user via the mobile device, the visual information indicator on the video display of the physical area at a real-time location from the real-time user location tracking information; and
   updating in real-time the visual information indicator on the video display of the physical area on the mobile device responsive to an update to the item from the first user and a corresponding updated assigned value for the update to the item from the profile of the set of profiles associated with the one or more users of the group of users.

2. The method of claim 1, further comprising the computer implemented step of enrolling the first user and the group of users as attendees of a same interactive event.

3. The method of claim 1, further comprising the computer-implemented step of displaying, along with the first user and the group of users, a set of items.

4. The method of claim 3, further comprising the computer-implemented step of recognizing an item from the set of items as having a highest assigned value.

5. The method of claim 1, the displaying further comprising providing, to the first user, a quantified geographic distance between the first user and each user of the group of users.

6. The method of claim 1, further comprising:
   determining a set of users from the group of users that have either: assigned a positive value to the item, or assigned a negative value to the item; and
   identifying, to the first user, the set of users.

7. The method of claim 6, further comprising the computer implemented step of providing an invite from the first user to the set of users to one or more social media websites associated with the first user.

8. The method of claim 1, the item including one or more of the following: a product, an idea, a discussion topic, a presentation topic, and a reaction to a presentation topic.

9. A system for evaluating an item distributed to a group of users, comprising:
   a memory medium comprising program instructions;
   a bus coupled to the memory medium; and
   a processor, for executing the program instructions, coupled to an collaboration tool via the bus that when executing the program instructions causes the system to:
   create a plurality of profiles for a first user, each profile of the plurality of profiles comprising a level of information associated with a type of event;
   obtain from a mobile device of the first user a scanned code associated with an event;
   identify a profile of the plurality of profiles of the first user associated with a type of the event based on the scanned code associated with the event;
   grant the group of users access to view the identified profile of the first user, wherein each user of the group of users has scanned the code associated with the event;
   receive, from the identified profile, the item from the first user;
   distribute the item to the group of users;
   receive an assigned value for the item and real-time user location tracking information from a set of profiles associated with the one or more users of the group of users, the set of profiles based on the code associated with the event scanned by the one or more users of the group of users;
   generate a visual information indicator corresponding to the assigned value and to a profile of the set of profiles associated with the one or more users of the group of users;
   associate the generated visual information indicator with the real-time user location tracking information;
   generate a video display of a physical area of the event;
   display, to the first user via the mobile device, the visual information indicator on the video display of the physical area at a real-time location from the real-time user location tracking information; and
   update in real-time the visual information indicator on the video display of the physical area on the mobile device responsive to an update to the item from the first user and a corresponding updated assigned value for the update to the item from the profile of the set of profiles associated with the one or more users of the group of users.

10. The system of claim 9, the program instructions further causing the system to enroll the first user and the group of users as attendees of a same interactive event.

11. The system of claim 9, the program instructions further causing the system to display, along with the first user and the group of users, a set of items.

12. The system of claim 11, the program instructions further causing the system to recognize an item from the set of items as having a highest assigned value.

13. The system of claim 9, the instructions further causing the system to provide, to the first user, a quantified geographic distance between the first user and each user of the group of users.

14. The system of claim 9, the instructions causing the system to:
   determine a set of users from the group of users that have either: assigned a positive value to the item, or assigned a negative value to the item; and
   identify, to the first user, the set of users.

15. The system of claim 9, the item including one or more of the following: a product, an idea, a discussion topic, a presentation topic, and a reaction to a presentation topic.

16. A computer program product for evaluating an item distributed to a group of users at a collaborative event, the computer program product comprising a computer readable hardware storage device, wherein the computer readable hardware storage device is not a transitory signal, and program instructions stored on the computer readable hardware storage device, to:
   create a plurality of profiles for a first user, each profile of the plurality of profiles comprising a level of information associated with a type of event;
   obtain from a mobile device of the first user a scanned code associated with an event;
   identify a profile of the plurality of profiles of the first user associated with a type of the event based on the scanned code associated with the event;
   grant the group of users access to view the identified profile of the first user, wherein each user of the group of users has scanned the code associated with the event;
   receive, from the identified profile, the item from the first user;
   distribute the item to the group of users;
   receive an assigned value for the item and real-time user location tracking information from a set of profiles associated with the one or more users of the group of users, the set of profiles based on the code associated with the event scanned by the one or more users of the group of users;
   generate a visual information indicator corresponding to the assigned value and to a profile of the set of profiles associated with the one or more users of the group of users;
   associate the generated visual information indicator with the real-time user location tracking information;
   generate a video display of a physical area of the event;
   display, to the first user via the mobile device, the visual information indicator on the video display of the physical area at a real-time location from the real-time user location tracking information; and
   update in real-time the visual information indicator on the video display of the physical area on the mobile device responsive to an update to the item from the first user and a corresponding updated assigned value for the update to the item from the profile of the set of profiles associated with the one or more users of the group of users.

17. The computer program product of claim 16, further comprising program instructions to display, along with the first user and the group of users, a set of items.

18. The computer program product of claim 16, further comprising program instructions to provide, to the first user, a quantified geographic distance between the first user and each user of the group of users.

19. The computer program product of claim 16, further comprising program instructions to:
   determine a set of users from the group of users that have either: assigned a positive value to the item, or assigned a negative value to the item; and
   identify, to the first user, the set of users.

20. The computer program product of claim 16, the item including one or more of the following: a product, an idea, a discussion topic, a presentation topic, and a reaction to a presentation topic.

* * * * *